United States Patent
Ghigliotty et al.

(10) Patent No.: US 10,215,031 B2
(45) Date of Patent: Feb. 26, 2019

(54) GAS TURBINE ENGINE COMPONENT COOLING WITH INTERLEAVED FACING TRIP STRIPS

(71) Applicant: UNITED TECHNOLOGIES CORPORATION, Hartford, CT (US)

(72) Inventors: Jaime G. Ghigliotty, Cabo Rojo, PR (US); Edward F. Pietraszkiewicz, Southington, CT (US); Dominic J. Mongillo, Jr., West Hartford, CT (US); Christopher Corcoran, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 613 days.

(21) Appl. No.: 14/769,600

(22) PCT Filed: Mar. 12, 2014

(86) PCT No.: PCT/US2014/024308
§ 371 (c)(1),
(2) Date: Aug. 21, 2015

(87) PCT Pub. No.: WO2014/159589
PCT Pub. Date: Oct. 2, 2014

(65) Prior Publication Data
US 2016/0003055 A1 Jan. 7, 2016

Related U.S. Application Data

(60) Provisional application No. 61/782,484, filed on Mar. 14, 2013.

(51) Int. Cl.
*F01D 5/18* (2006.01)
*B22C 9/10* (2006.01)
*B22D 25/02* (2006.01)

(52) U.S. Cl.
CPC ............. *F01D 5/187* (2013.01); *B22C 9/10* (2013.01); *B22D 25/02* (2013.01); *F01D 5/186* (2013.01);
(Continued)

(58) Field of Classification Search
CPC ............ F01D 5/187; F05D 2260/2212; F05D 2260/22141
See application file for complete search history.

(56) References Cited

U.S. PATENT DOCUMENTS 5,052,889 A * 10/1991 Abdel-Messeh ........ F01D 5/187
165/170
5,232,343 A * 8/1993 Butts ....................... F01D 5/187
415/115

(Continued)

FOREIGN PATENT DOCUMENTS

EP         1637699 A2    3/2006

OTHER PUBLICATIONS

U.S. Appl. No. 13/630,107, filed Sep. 28, 2012 titled Airfoil With Variable Test Strip Height.

(Continued)

*Primary Examiner* — Mark Laurenzi
*Assistant Examiner* — Xiaoting Hu
(74) *Attorney, Agent, or Firm* — Carlson, Gaskey & Olds, P.C.

(57) ABSTRACT

A gas turbine engine component includes first and second walls spaced apart from one another to provide a cooling passage. First and second trip strips are respectively provided on the first and second walls and arranged to face one another. The first and second trip strips are arranged in an interleaved fashion with respect to one another in a direction.

14 Claims, 6 Drawing Sheets

(52) U.S. Cl.
    CPC ...... *F05D 2220/32* (2013.01); *F05D 2230/30* (2013.01); *F05D 2240/303* (2013.01); *F05D 2240/304* (2013.01); *F05D 2250/185* (2013.01); *F05D 2260/202* (2013.01); *F05D 2260/2212* (2013.01); *F05D 2260/22141* (2013.01); *Y02T 50/676* (2013.01)

(56) References Cited

U.S. PATENT DOCUMENTS

| | | | | |
|---|---|---|---|---|
| 5,395,212 | A | * | 3/1995 | Anzai ..................... F01D 5/187 415/115 |
| 5,502,889 | A | | 4/1996 | Casson et al. |
| 6,068,445 | A | * | 5/2000 | Beeck ..................... F01D 5/187 416/96 A |
| 6,343,474 | B1 | * | 2/2002 | Beeck ..................... F01D 5/187 416/97 R |
| 6,997,675 | B2 | | 2/2006 | Dube et al. |
| 7,967,567 | B2 | | 6/2011 | Liang |
| 8,025,482 | B1 | | 9/2011 | Liang |
| 8,328,518 | B2 | | 12/2012 | Liang et al. |
| 2007/0297916 | A1 | | 12/2007 | Levine et al. |
| 2011/0286857 | A1 | | 11/2011 | Gleiner et al. |
| 2012/0328450 | A1 | | 12/2012 | Spangler et al. |
| 2013/0243591 | A1 | * | 9/2013 | Propheter-Hinckley ..................... F01D 5/187 416/1 |

OTHER PUBLICATIONS

U.S. Appl. No. 13/591,773, filed Aug. 22, 2012 titled Gas Turbine Engine Airfoil Internal Cooling Features.
International Search Report and Written Opinion for PCT Application No. PCT/US2014/024308, dated Jul. 3, 2014.
Supplementary European Search Report for European Application No. 14774119.3 dated Jan. 5, 2017.
International Preliminary Report on Patentability for International Application No. PCT/US2014/024308 dated Sep. 24, 2015.

* cited by examiner

GAS TURBINE ENGINE COMPONENT COOLING WITH INTERLEAVED FACING TRIP STRIPS

BACKGROUND

This disclosure relates to a gas turbine engine component cooling passage. More particularly, the disclosure relates to a cooling configuration that uses trip strips within the cooling passage.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components include internal cooling passages, some of which are configured to provide a serpentine shape. Some of the cooling passages may include portions having turbulence promoters, such as trip strips, that enhance the cooling effects of the cooling flow through the cooling passage.

Chevron trip strips have been used as turbulence promoters in one or more serpentine cooling passages within the airfoil. The chevrons are typically symmetrical. Chevron trip strips may be provided on each of the opposing faces of a given cooling passage and aligned with one another in a radial direction of the airfoil.

SUMMARY

In one exemplary embodiment, a gas turbine engine component includes first and second walls spaced apart from one another to provide a cooling passage. First and second trip strips are respectively provided on the first and second walls and arranged to face one another. The first and second trip strips are arranged in an interleaved fashion with respect to one another in a direction.

In a further embodiment of the above, the gas turbine engine component is an airfoil. The direction is a radial direction of the airfoil.

In a further embodiment of any of the above, the cooling passage is provided near a leading edge of the airfoil.

In a further embodiment of any of the above, trip strips are chevron trip strips arranged asymmetrically. An apex of the chevron trip strips shifted within the cooling passage toward a leading edge.

In a further embodiment of any of the above, the cooling passage is provided near a trailing edge of the airfoil.

In a further embodiment of any of the above, the trip strips are chevron trip strips.

In a further embodiment of any of the above, the trip strips extend from an inner surface a distance e. First and second walls respectively include first and second inner surfaces that are spaced a distance H from one another. An e/H ratio is provided in the range of 0.05-0.40.

In a further embodiment of any of the above, the trip strips are spaced from an opposing surface a distance in the range 0.035-0.045 inch (0.89-1.14 mm) The trip strips are spaced from a die parting line through the component a distance in the range of 0.01-0.02 inch (0.25-0.51 mm).

In a further embodiment of any of the above, the cooling passage is arranged in a serpentine configuration.

In another exemplary embodiment, a gas turbine engine airfoil includes first and second walls spaced apart from one another to provide a cooling passage near a leading edge of the airfoil. Trip strips provide one of the first and second walls. The trip strips are chevron trip strips that are arranged asymmetrically. An apex of the chevron trip strips shifted within the cooling passage toward the leading edge.

In a further embodiment of any of the above, the trip strips are arranged on a suction side of the airfoil.

In a further embodiment of any of the above, the trip strips provide first trip strips. Second trip strips are provided on the second wall. The first and second trip strips are arranged to face one another.

In a further embodiment of any of the above, the first and second trip strips are arranged in an interleaved fashion with respect to one another in a direction.

In a further embodiment of any of the above, the trip strips extend from an inner surface a distance e, and the first and second walls respectively include first and second inner surfaces that are spaced a distance H from one another. An e/H ratio is provided in the range of 0.05-0.40.

In a further embodiment of any of the above, the trip strips are spaced from an opposing surface a distance in the range 0.035-0.045 inch (0.89-1.14 mm) The trip strip is spaced from a die parting line through the component a distance in the range of 0.01-0.02 inch (0.25-0.51 mm).

BRIEF DESCRIPTION OF THE DRAWINGS

The disclosure can be further understood by reference to the following detailed description when considered in connection with the accompanying drawings wherein.

DETAILED DESCRIPTION

Figure 1:
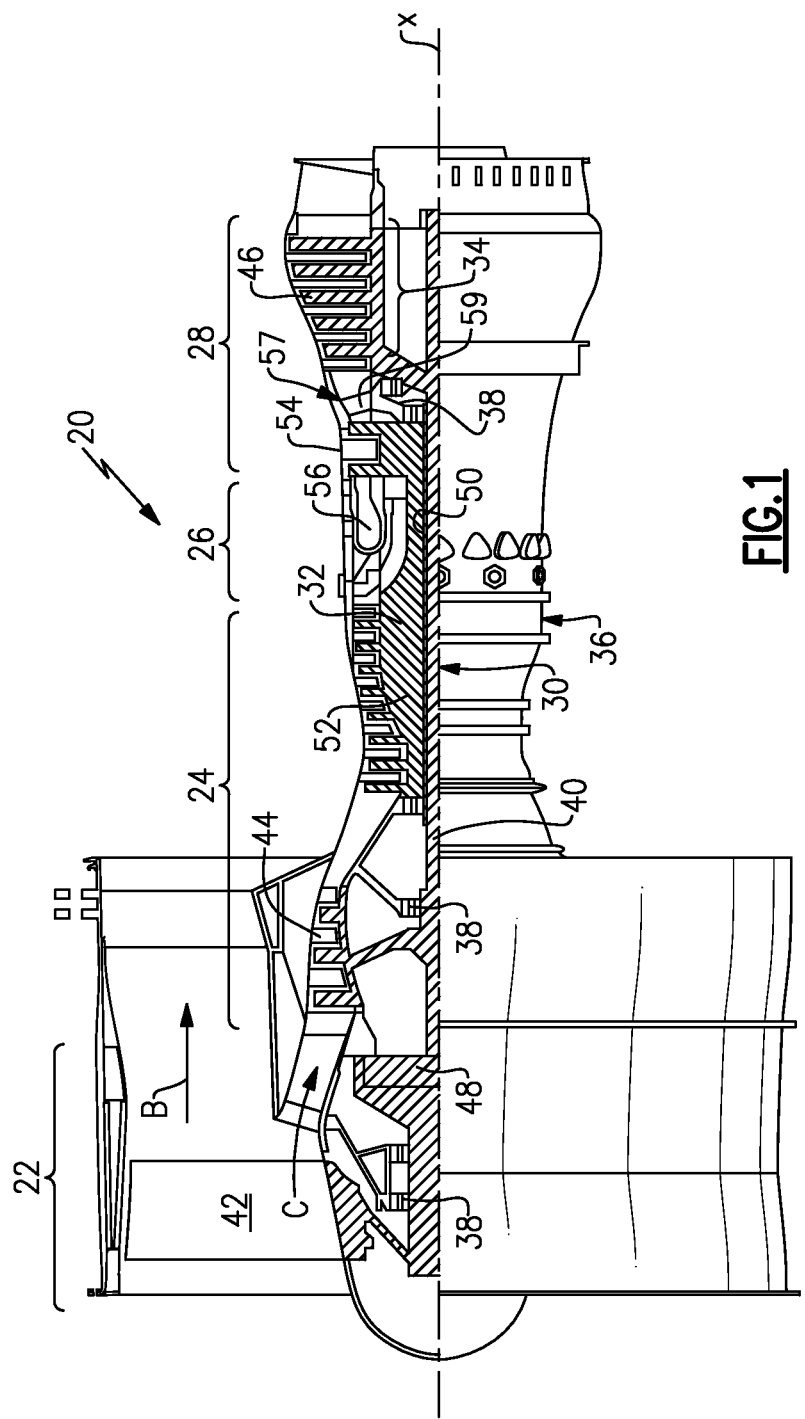
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

The disclosed cooling passage may be used in various gas turbine engine components. For exemplary purposes, a turbine blade 64 is described. It should be understood that the cooling passage may also be used in vanes, blade outer air seals, and turbine platforms, for example.

Figure 2A:
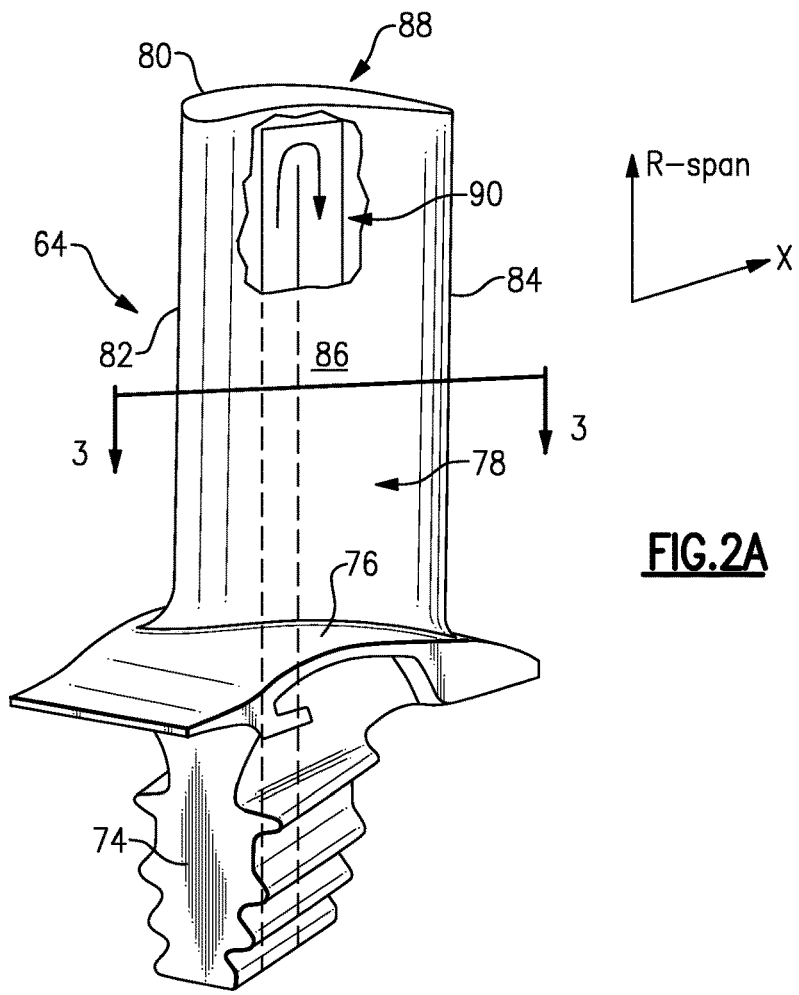
FIG. 2A is a perspective view of the airfoil having the disclosed cooling passage.
Figure 2B:
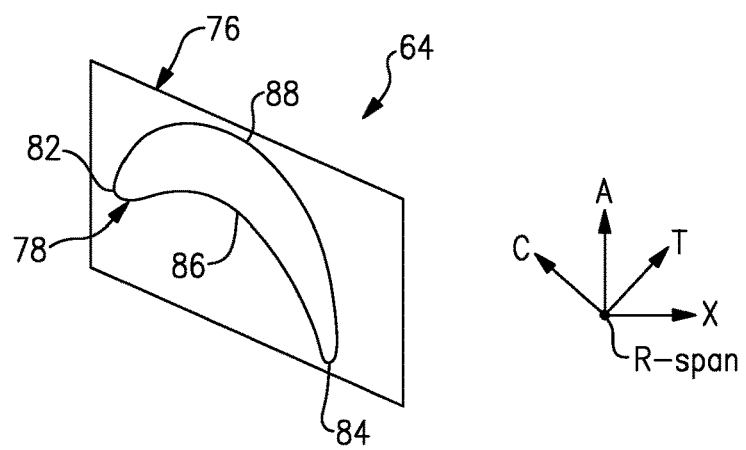
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Figure 3:
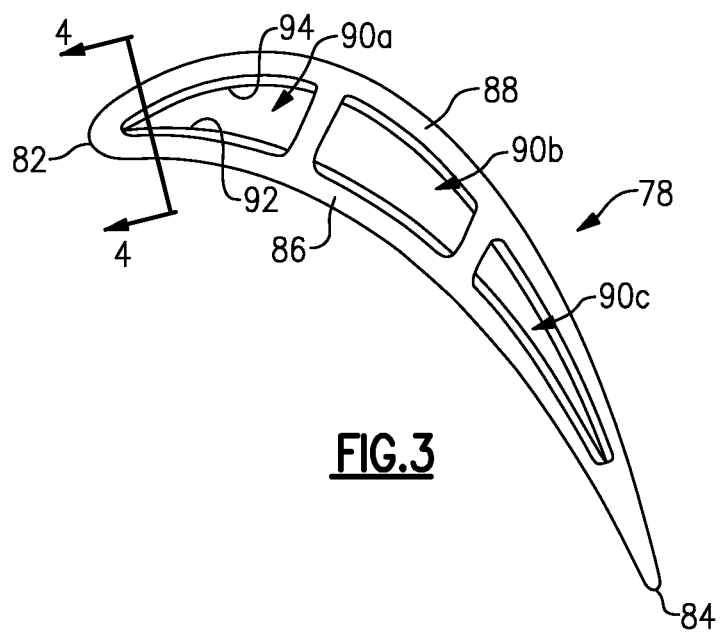
FIG. 3 is a cross-sectional view of an airfoil illustrated in FIG. 2A taken along line 3-3.

Flow through the cooling passage 90 illustrated in FIG. 2A is shown in more detail in FIG. 3. In one example, first, second and third cooling passages 90a, 90b, 90c are provided in the airfoil 78. In the example, the cooling passages are provided in a serpentine arrangement, which can be understood by reference to the core 104 illustrated in FIG. 5A, which forms the cooling passage 90 within the airfoil 78 during the casting process. It should be understood that the airfoil 78 may also formed by an additive manufacturing process.

Figure 4:
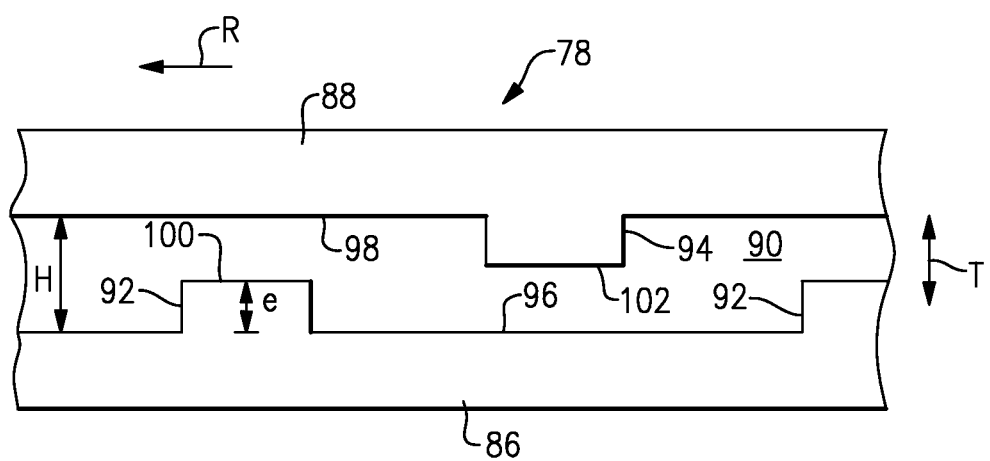
FIG. 4 is a cross-sectional view taken along line 4-4 of FIG. 3.

With reference to FIGS. 3 and 4, one or more of the cooling passages 90a, 90b, 90c include first and second trip strips 92, 94 respectively provided on opposing walls, such as the pressure and suction side walls 86, 88 of the airfoil 78. The first and second trip strips 92, 94 respectively include first and second faces 100, 102 that extend inwardly in the thickness direction T from first and second inner surfaces 96, 98 that are provided by the pressure and suction side walls 86, 88, respectively. As best shown in FIG. 4, the first and second trip strips 92, 94 are arranged relative to one another in an interleaved relationship in the radial direction R, in the example. Positioning the first and second faces 100, 102 of the first and second trip strips 92, 94 in this fashion maximizes the clearance between the first and second faces 100, 102 and is opposing inner surface.

The first and second inner surfaces 96, 98 are spaced apart from one another in the thickness direction T a distance H, which corresponds to the height of the cooling passage. The trip strips extend a distance e from their respective inner surface. The e/H ratio can be indicative of the effectiveness of the trip strips. In one example, a desirable e/H ratio is in a range of 0.05-0.40. Having opposing trip strips aligned with one another in the radial direction can result in an e/H ratio that is undesirably high in tight spaces, such as near the leading and trailing edges 82, 84, which reduces the cooling effectiveness of the trip strips.

Figures 5A, 5B:
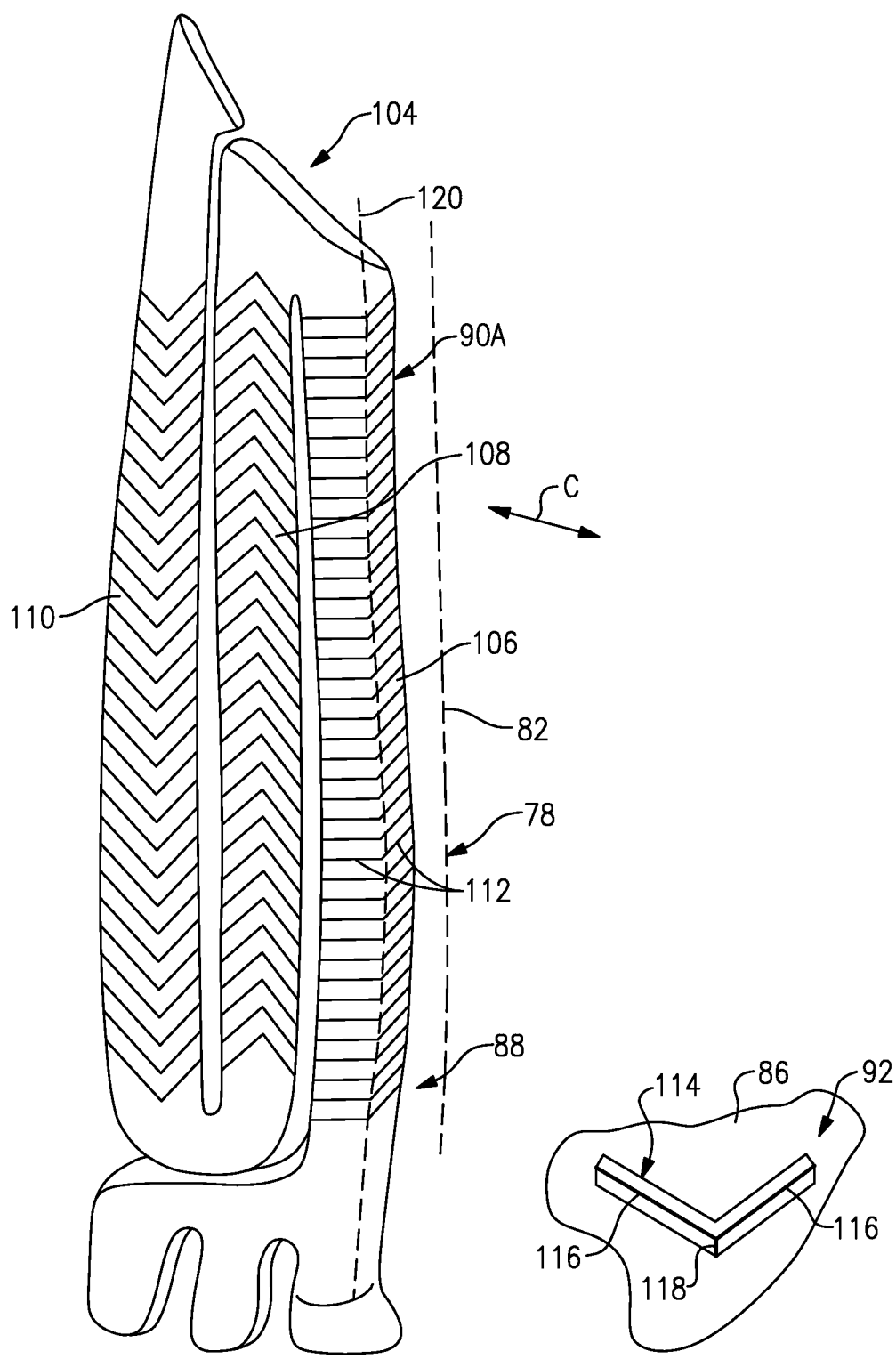
FIG. 5A is a perspective view of an example core used to form cooling passages within the airfoil.
FIG. 5B is a perspective view of a chevron trip strip formed by the core shown in FIG. 5A.

Referring to FIG. 5A, the core 104 includes first, second and third core portions 106, 108, 110 that respectively provide the first, second and third cooling passages 90a, 90b, 90c. The core 104 includes recesses 112 that provide the trip strips 92, 94 in the finished airfoil. One example trip strip 92 is illustrated in FIG. 5B. The example trip strip 92 is a chevron trip strip 114 having legs 116 joined to one another at an apex 118. Typically, the apex faces into the flow of the cooling fluid.

As shown in FIG. 5A, it may be desirable to configure chevron trip strips in an asymmetrical fashion. As shown by the first core portion 106, the apexes of the chevron trip strips are aligned along a curve 120. In one example, the curve 120 is offset within the first cooling passage 90a in the chordwise direction C toward the leading edge 82. This may be desirable, for example, on the suction side wall 88 of the airfoil 78, to maximize heat transfer by providing better convective cooling at a region with a high heat load, which helps prevent oxidation and erosion at the suction side leading edge, for example.

Figure 6A:
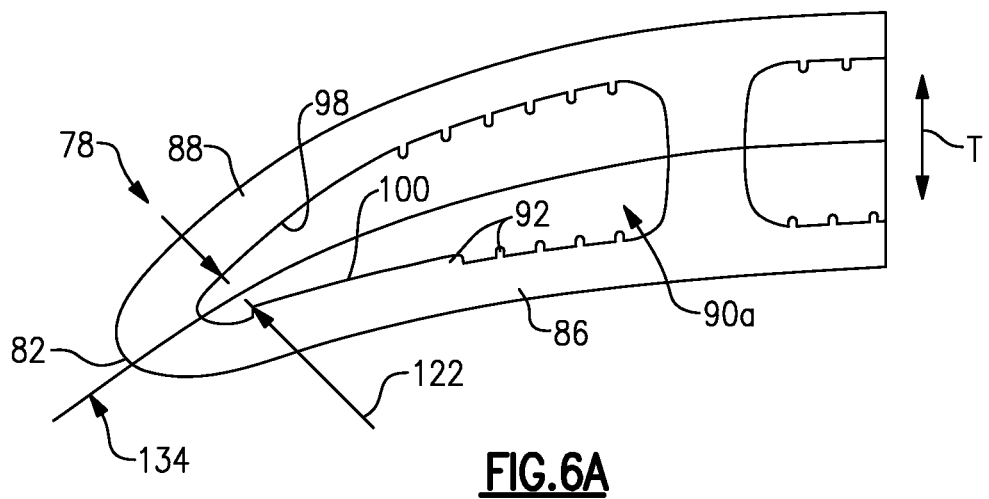
FIGS. 6A and 6B are cross-sectional views of the airfoil respectively taken at first and second radial locations near the leading edge.
Figure 6B:
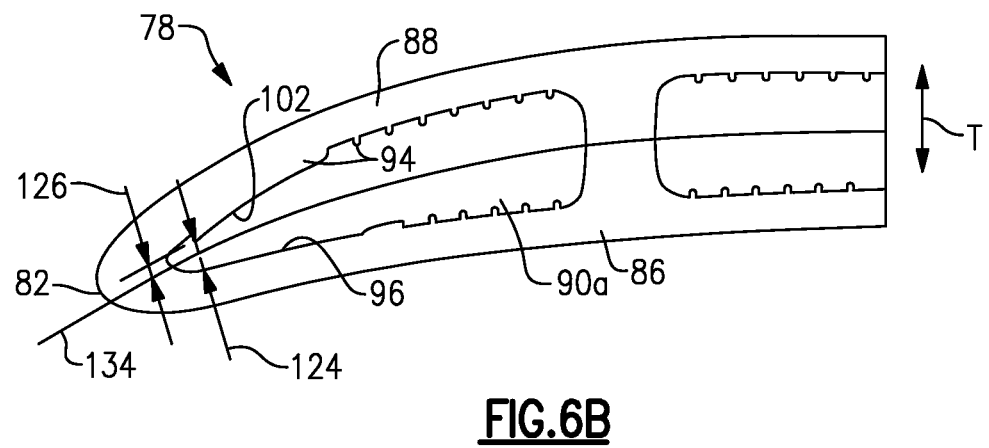

The alternating, interleaved relationship between the trip strips 92, 94 within the first cooling passage 90a is shown in FIG. 6A and 6B. A die parting line 134 bisects the airfoil 78 in the thickness direction T. As shown in FIG. 6A, the face 100 of the first trip strip 92 is spaced a distance 122 from the second inner surface 98. Referring to FIG. 6B, the second face 102 of the second trip strip 94 is spaced a second distance 124 from the first inner surface 96. In the example, the first and second distances 122, 124 may be in the range of 0.035-0.045 in (0.89-1.14 mm) The second face 102 may be spaced from the die parting line 134 a third distance 126, which may be in the range of 0.01-0.02 in (0.25-0.51 mm).

Figure 7A:
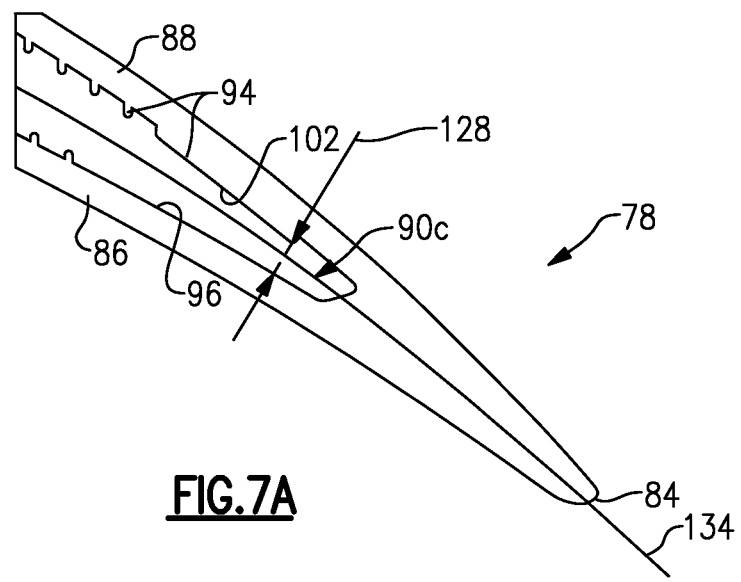
FIGS. 7A and 7B are cross-sectional views respectively taken at first and second locations near the trailing edge.
Figure 7B:
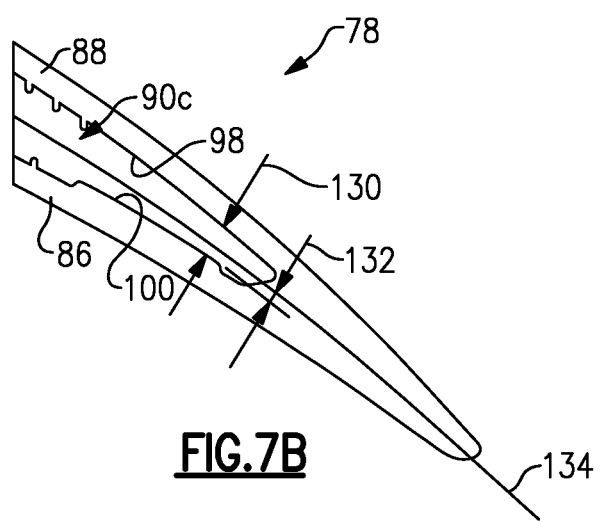

The trip strips 92, 94 within the third cooling passage 90c at the trailing edge are shown in more detail in FIGS. 7A and 7B. Referring to 7A, the second face 102 is spaced a fourth distance 128 from the first inner surface 96. Referring to FIG. 7B, the first face 100 is spaced a fifth distance 130 from the second inner surface 98. The first face 100 is spaced a sixth distance 132 from the die parting line 134. The fourth and fifth distances are in the range of 0.035-0.045 in (0.89-1.14 mm), and the sixth distances in the range of 0.01-0.02 in (0.25-0.51 mm).

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine component, wherein the gas turbine engine component is an airfoil, comprising:
   first and second walls spaced apart from one another to provide a cooling passage, wherein the cooling passage is provided near a leading edge of the airfoil, first and second trip strips respectively provided on the first and second walls and arranged to face one another, the first and second trip strips arranged in an interleaved fashion with respect to one another in a radial direction, wherein the first and second trip strips are chevron trip strips arranged asymmetrically, the chevron trip strips having first and second legs of varying length joined at an apex that is shifted within the cooling passage toward the leading edge relative to a center of the cooling passage, the first leg nearer the leading edge than the second leg, the first leg at an acute angle relative to the leading edge; wherein
   the apex of each chevron trip strip in at least the first trip strips is aligned on a curve.

2. The gas turbine engine component according to claim 1, wherein the first and second walls respectively include first and second inner surfaces that are spaced a distance H from one another, the first and second trip strips respectively extend from the first and second inner surfaces a distance e, and an e/H ratio is provided in the range of 0.05-0.40.

3. The gas turbine engine component according to claim 2, wherein the first and second trip strips are spaced from respective opposing surfaces a distance in the range of 0.035-0.045 inch (0.89-1.14mm), and the first and second trip strips are spaced from a die parting line bisecting the component in a thickness direction a distance in the range of 0.01-0.02inch (0.25-0.51mm).

4. The gas turbine engine component according to claim 1, wherein the cooling passage is arranged in a serpentine configuration.

5. The gas turbine engine components according to claim 1, wherein either of the first and second trip strips is arranged on a suction side of the airfoil.

6. The gas turbine engine component of claim 1, wherein at least some of the chevron trip strips in the first trip strip extend across the entire chordwise width of the first wall at their respective radial locations.

7. The gas turbine engine component of claim 6, wherein more than half of the chevron trip strips in the first trip strip extend across the entire chordwise width of the first wall at their respective radial locations.

8. A gas turbine engine component, wherein the gas turbine engine component is an airfoil, comprising:
first and second walls spaced apart from one another to provide a first cooling passage, wherein the first cooling passage is provided near a leading edge of the airfoil, first and second trip strips respectively provided on the first and second walls and arranged to face one another, the first and second trip strips arranged in an interleaved fashion with respect to one another in a radial direction, wherein the first and second trip strips are chevron trip strips arranged asymmetrically, the chevron trip strips having first and second legs joined at an apex that is shifted within the first cooling passage toward the leading edge relative to a center of the first cooling passage, the first leg nearer the leading edge than the second leg, the first leg at an acute angle relative to the leading edge; wherein
the apex of each chevron trip strip in at least the first trip strips is aligned along a first curve.

9. The gas turbine engine component of claim 8, wherein the chordwise position of the first curve varies along the radial direction.

10. The gas turbine engine component of claim 8, further comprising:
a second cooling passage provided by third and fourth walls; and
third and fourth chevron trip strips respectively provided on the third and fourth walls; wherein
each of the third chevron trip strips has an apex aligned along a second curve.

11. The gas turbine engine component of claim 10, further comprising:
a third cooling passage provided by fifth and sixth walls; and
fifth and sixth chevron trip strips respectively provided on the fifth and sixth walls; wherein
each of the fifth chevron trip strips has an apex aligned along a third curve.

12. The gas turbine engine component of claim 11, wherein the first curve and the third curve are convex in opposite directions on a chordwise axis.

13. The gas turbine engine component of claim 8, wherein at least some of the chevron trip strips in the first trip strip extend across an entire chordwise width of the first wall at their respective radial locations.

14. The gas turbine engine component of claim 13, wherein more than half of the chevron trip strips in the first trip strip extend across the entire chordwise width of the first wall at their respective radial locations.

\* \* \* \* \*